(12) United States Patent
Kim

(10) Patent No.: US 6,715,648 B2
(45) Date of Patent: Apr. 6, 2004

(54) ICE CREAM DISPENSER

(76) Inventor: Hui-Taek Kim, 201 Royalgreen-Villa, 436-5 Hakwangkyo-Dong, Jangan-Gu, Suwon-Si, Kyunggi-Do 440-260 (KR)

( * ) Notice: Subject to any disclaimer, the term of this patent is extended or adjusted under 35 U.S.C. 154(b) by 63 days.

(21) Appl. No.: 10/153,517

(22) Filed: May 21, 2002

(65) Prior Publication Data

US 2003/0019887 A1 Jan. 30, 2003

(30) Foreign Application Priority Data

Jul. 28, 2001 (KR) ........................................ 2001-45678

(51) Int. Cl.$^7$ ................................................. B67D 5/40
(52) U.S. Cl. ...................................... 222/327; 222/386
(58) Field of Search ............................. 222/146.6, 366, 222/327, 386, 387, 390, 391

(56) References Cited

U.S. PATENT DOCUMENTS

| | | | | | |
|---|---|---|---|---|---|
| 2,491,259 A | * | 12/1949 | Funderburg | ................. | 222/386 |
| 3,162,337 A | * | 12/1964 | Sabaka | ........................ | 222/327 |
| 3,456,849 A | * | 7/1969 | Sjostrand | .................... | 222/327 |
| 3,664,508 A | * | 5/1972 | Linder | ......................... | 222/386 |
| 4,077,550 A | * | 3/1978 | van Manen | ................. | 222/327 |
| 4,373,646 A | * | 2/1983 | MacEwen | ................... | 222/327 |
| 4,664,299 A | * | 5/1987 | Goncalves | .................. | 222/327 |
| 4,678,107 A | * | 7/1987 | Ennis, III | ................ | 222/386.5 |
| 5,020,698 A | * | 6/1991 | Crossley | ...................... | 222/386 |
| 5,918,767 A | * | 7/1999 | McGill | ........................ | 222/386 |
| 5,967,381 A | * | 10/1999 | van Zeeland et al. | ....... | 222/327 |
| 6,319,532 B1 | * | 11/2001 | Pineault | ...................... | 222/386 |

\* cited by examiner

*Primary Examiner*—Kenneth Bomberg
(74) *Attorney, Agent, or Firm*—R. Neil Sudol; Henry D. Coleman; William J. Sapone

(57) ABSTRACT

The present invention relates to an ice cream dispenser which is directed to effectively discharging an ice cream from the interior of a dispensing container without any transformation and damage of the dispensing container by providing a lid which slides in the interior of the body of the dispensing container and a pressing device which transfers a uniform pressure to the lid. In an ice cream dispenser including a container body which is fixed by a fixing jig and has one opened end for receiving an ice cream therethrough and an openable discharging port formed in the other end, a lid for covering the opened end of the container body, and a piston for pressurizing the lid, an ice cream dispenser comprises a cover for covering the interior of the container body for discharging an ice cream through the discharging port as the lid slides in the interior of the container body, and a slip portion formed in an outer circumferential surface of the cover for thereby closely contacting with an inner wall surface of the container body opposite each other.

6 Claims, 5 Drawing Sheets

[Fig. 1]
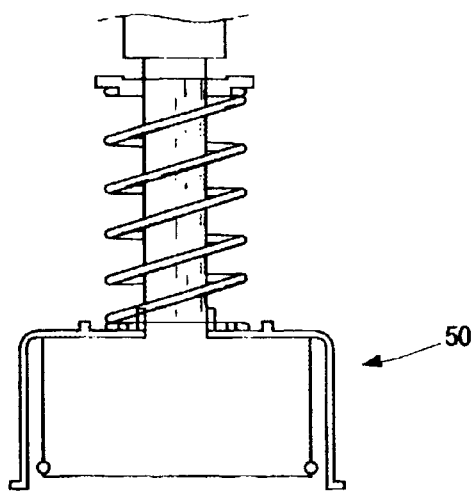
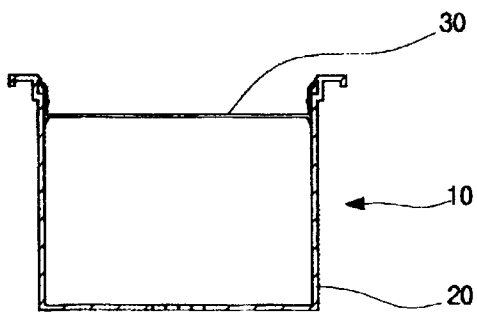
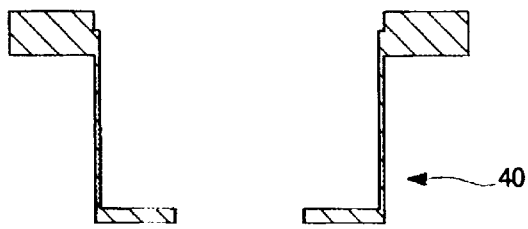
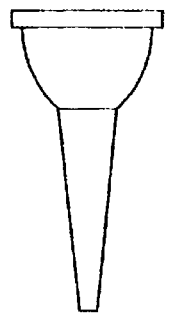

[Fig. 2]
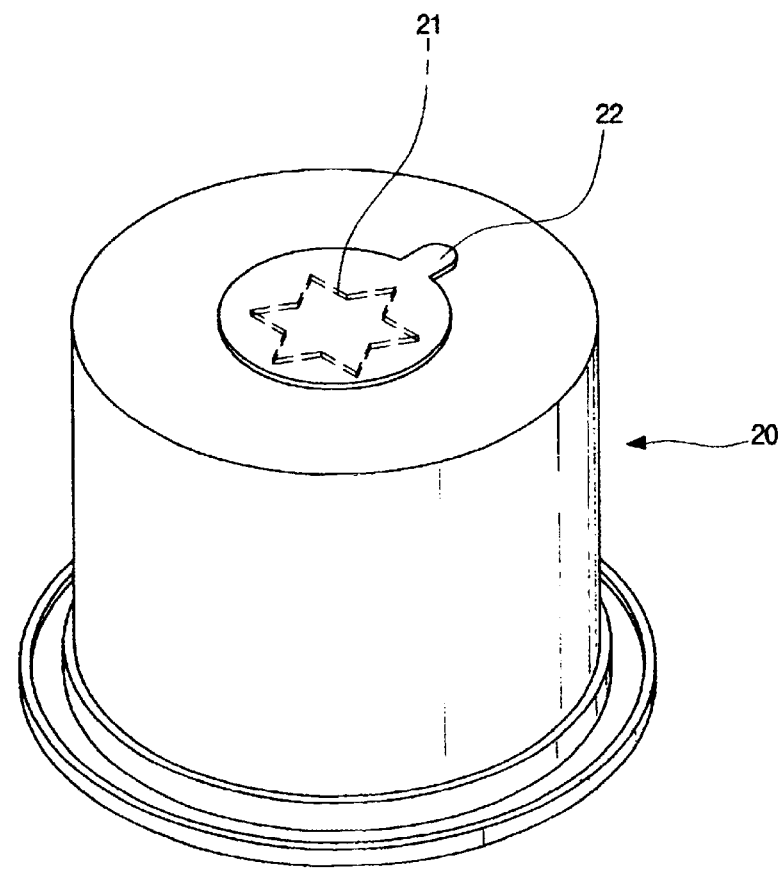
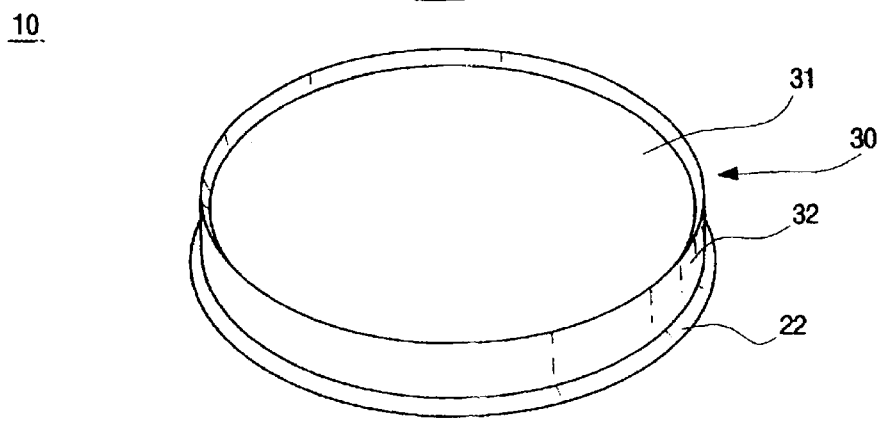

[Fig. 3]
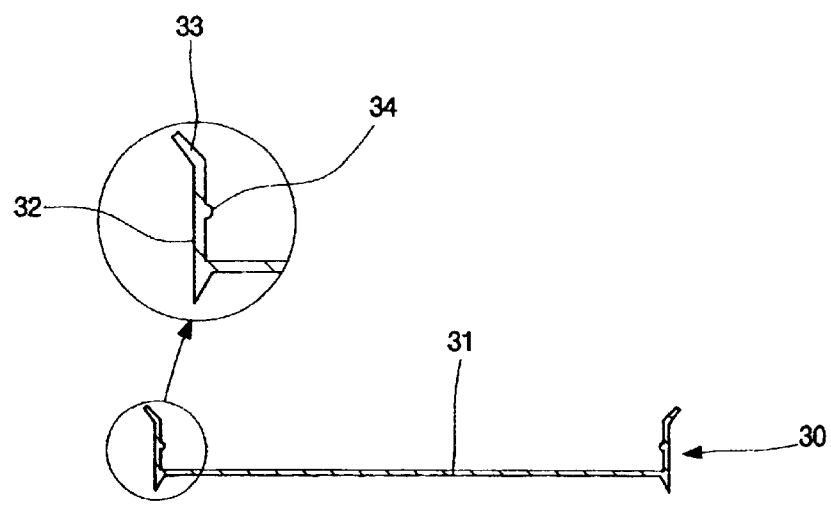
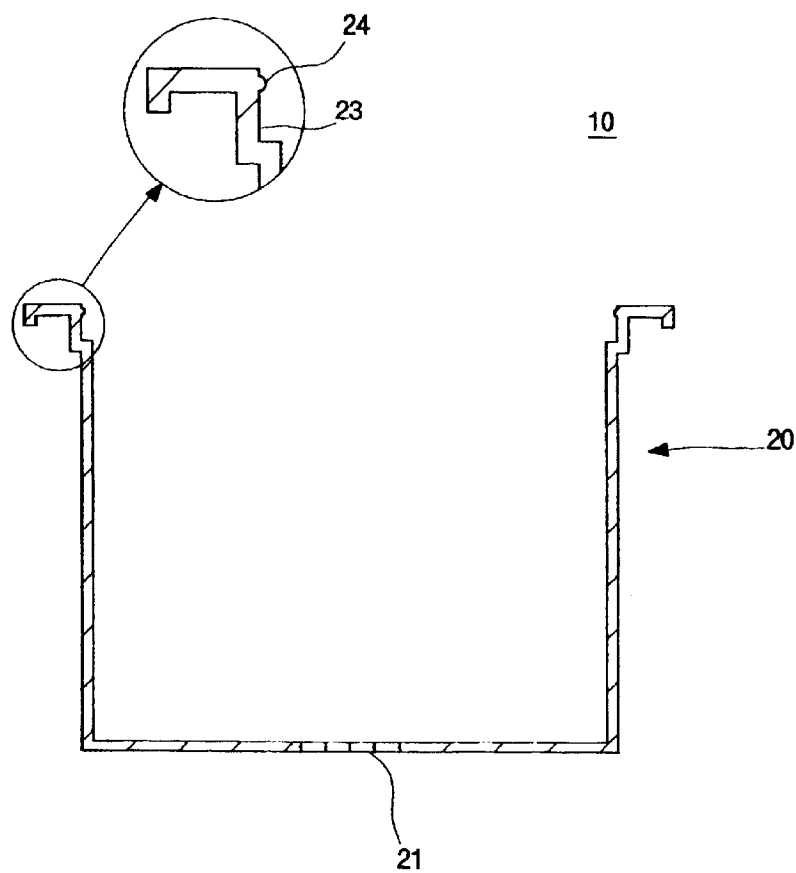

[Fig. 4]
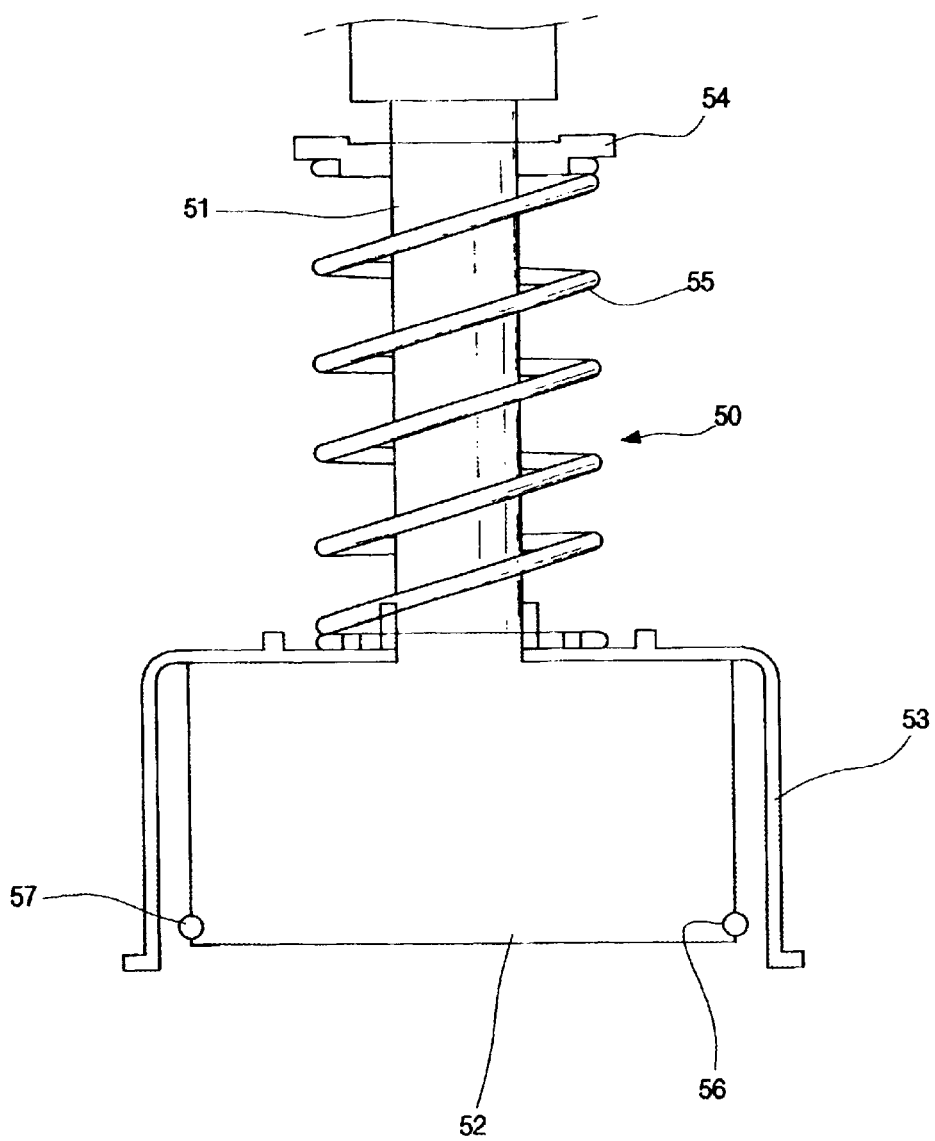

[Fig. 5]
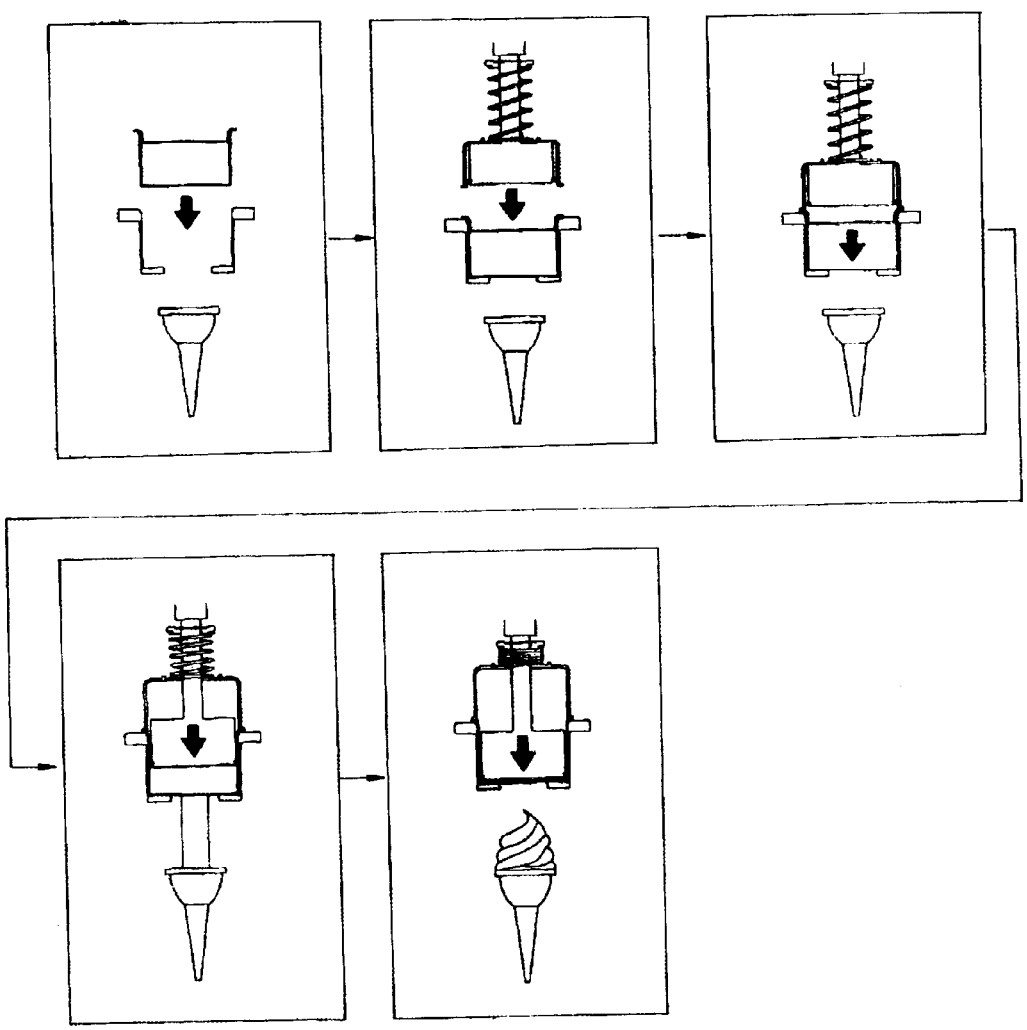

ICE CREAM DISPENSER

BACKGROUND OF THE INVENTION

1. Field of the Invention

The present invention relates to an ice cream dispenser, and in particular to an ice cream dispenser which is capable of effectively dispensing an ice cream from an ice cream dispenser without any transformation and damage of an ice cream dispensing container.

2. Description of the Background Art

Generally, an ice cream is eaten in a soft iced state. In order to sell the above ice cream, a container having an ice cream therein is provided in the interior of a freezer, and the freezer is opened, and the ice cream is manually scooped from the container of the freezer, and the scooped ice cream is filled in a certain shaped corn cake.

The thusly sold ice cream may be polluted by a certain pollutant. In addition, the amount of the scooped ice cream is not constant. In order to overcome the above problems, an ice cream dispenser is provided. The above ice cream dispenser is capable of pressurizing the ice cream dispensing container having an ice cream therein for thereby discharging the ice cream to the outside.

However, in the conventional ice cream dispenser, the pressurizing pressure of the ice cream dispenser may not be uniformly applied to the ice cream dispensing container or the ice cream dispensing container may be burst during the pressurizing operation by a certain defect in the dispensing container.

In addition, the ice cream may be stuck to a certain portion of the dispensing container due to the transformation of the dispensing container during the pressurizing operation of the ice cream, which may cause a problem of a waste of the ice cream.

SUMMARY OF THE INVENTION

Accordingly, it is an object of the present invention to provide an ice cream dispenser which overcomes the problems encountered in the conventional art.

It is another object of the present invention to provide an ice cream dispenser which is capable of effectively discharging an ice cream from the interior of a dispensing container without any transformation and damage of the dispensing container by providing a lid which slides in the interior of the body of the dispensing container and a pressing device which transfers a uniform pressure to the lid.

In order to achieve the above objects, there is provided an ice cream dispenser which includes a cover for covering the interior of the container body for discharging an ice cream through the discharging port as the lid slides in the interior of the container body, and a slip portion formed in an outer circumferential surface of the cover for thereby closely contacting with an inner wall surface of the container body opposite each other wherein the ice cream dispenser includes a container body which is fixed by a fixing jig and has one opened end for receiving an ice cream therethrough and an openable discharging port formed in the other end, a lid for covering the opened end of the container body, and a piston for pressurizing the lid.

BRIEF DESCRIPTION OF THE DRAWINGS

The present invention will become better understood with reference to the accompanying drawings which are given only by way of illustration and thus are not limitative of the present invention, wherein;

FIG. 1 is a cross-sectional view illustrating an ice cream dispenser according to the present invention;

FIG. 2 is a perspective view illustrating an ice cream container;

FIG. 3 is a cross-sectional view illustrating an ice cream container,

FIG. 4 is a cross-sectional view illustrating a pressing device according to the present invention; and FIG. 5 is a view illustrating an operation of an ice cream dispenser according to the present invention.

DETAILED DESCRIPTION OF THE PREFERRED EMBODIMENTS

The preferred embodiments of the present invention will be described with reference to the accompanying drawings.

FIG. 1 is a cross-sectional view illustrating an ice cream dispenser according to the present invention. As shown therein, an ice cream dispensing container 10 is provided in a freezer for storing a soft iced cream and dispensing the stored ice cream. The ice cream dispenser is provided in the upper and lower sides for installing the dispensing container 10. The ice cream dispenser includes a fixing jig 40 for stably fixing the dispensing container 10, and a pressing device 50 for pressurizing a certain pressure to the dispensing container 10.

At this time, the fixing jig 40 has a hollow cylindrical shape interior for thereby fixedly installing the container body 20 therein, an upper side opened, and a lower surface having a through hole having a diameter larger than a discharging port 21 of the container body 20.

In the present invention, the slidable lid 30 is installed in the interior of the container body 20 for effectively discharging the ice cream from the interior of the container body 20 without any transformation and damage of the dispensing container 10.

As shown in FIGS. 2 and 3, the dispensing container 10 includes a container body 20 installed in a lower portion for storing an ice cream therein, and a lid 30 installed in an upper portion for covering the container body 20.

The container body 20 has an opened upper side and is formed in a cylindrical shape as a food storing container for thereby storing an ice cream therein. The container body 20 includes a discharging port 21 for thereby discharging an ice cream downwardly. The discharging port 21 is closed by a sticker 22 when selling the ice cream. When installing in the dispensing device, the sticker 22 is removed.

A lid 30 is installed in the opened upper side of the container body 20 for covering the upper side of the container body 20. When a pressure is applied to the lid 30 from the upper side by the dispensing device, the lid 30 is downwardly moved and pressurizes the ice cream stored in the interior of the container body 20, so that the ice cream is discharged to the outside through the discharging port 21 formed in the lower portion of the container body 20 by the pressurizing force.

Namely, the lid 30 includes a circular plate shaped cover 31 for covering the interior of the container body 20, and a wide circular ring shaped slip portion is 32 which is integrally formed with an outer circumferential portion of the cover 31 and closely contacts with an inner wall surface of the container body 20, so that the lid 30 slides in the interior of the container body 20 for thereby pressurizing the ice cream therein.

At this time, an outwardly expanding tapered close-contact portion 33 is formed in an end portion of a slip portion 32 which is formed in an outer side of the container body 20 in such a manner the close-contacting portion 33 is contracted in the center direction when advancing into the interior of the container body 20 for thereby elastically close-contacting with the inner wall surface of the container body 20. An entrance portion 23 is formed in the entrance of the container body 20 and forms an expanding step portion for thereby installing the close-contact portion 33 therein.

As shown in FIG. 3, the upper inner surface of the fixing jig 40 installed in the outer portion of the entrance portion 23 is stepped to correspond with the outer portion of the entrance portion 23.

An engaging shoulder portion 24 is protruded in the center direction and is formed in the inner side of the entrance portion 23 for thereby preventing the lid 30 from being escaped to the outside of the container body 20 in such a manner that a front end of the tapered close-contact portion 33 installed in the interior of the same is laid over.

An expansion protrusion 34 is formed in the inner side of the slip portion 32 formed in the outer side of the lid 30 in such a manner that the slip portion 32 is outwardly expanded for thereby contacting with an inner wall surface of the container body 20 when a piston 52 of a pressing device 50 is inserted.

As shown in FIG. 4, the pressing device 50 is capable of pressurizing the lid 30 of the dispensing container 10 and includes a connection rod 51 connected with a lever(not shown) and is operable in the upward and downward directions, and a piston 52 which is integrally formed with the connection rod 51 and is inserted into the interior of the slip portion 32 of the lid 30 and is closely contacted with an inner surface of the slip portion 32 of the same.

A hollow cylindrical cover 53 covers the piston 52 for thereby preventing a foreign substance from being inserted into the interior of the piston 52. The lower portion of the cover 53 is opened and is expanded in the outer direction to closely correspond with the upper end of the fixing jig 40.

A fixing ring 54 is fixedly installed on an upper end of the connection rod 51, and a spring 55 is installed between the upper portions of the fixing ring 54 and the cover 53 for thereby surrounding the connection rod 51. The spring 55 is contracted between the fixing ring 54 and the cover 53 when the connection rod 51 downwardly moves the piston 52 in a state that the fixing jig 40 and the cover 53 are closly contacted, and in a state that the force moving the piston 52 is removed, the spring expands the portion between the fixing ring 54 and the cover 53 by an elastic force of the same for thereby returning the fixing ring 54 and the connection rod 51 and piston 52 connected thereto.

In addition, a circular groove 56 concaved in a semi-circular shape in a cross section is formed along an outer surface of the lower side of the piston 52, and a rubber O-ring 57 is installed into the interior of the circular groove 56 in a protruded shape for thereby being closely contacting with an inner portion of the slip portion 32 formed in an outer portion of the lid 30.

The lid 30 which is slidable in the interior of the container body 20 and the piston 52 which applies a certain pressure to the lid 30 are stably engaged based on a close contact using the O-ring 57, so that the lid 30 is moved upwardly and downwardly when the piston 52 is moved upwardly and downwardly.

In the present invention, the ice cream is stored in the ice cream dispenser and is moved to a certain place for sale in a frozen state. The ice cream dispenser is stalled, and a sticker 22 is removed. Thereafter, the lever of the dispensing device is pressed, and the ice cream is discharged and is filled in a corn cake.

Namely, as shown in FIG. 5, the container body 20 is installed in the interior of the fixing jig 40, and the pressing device 50 is installed in the upper portion of the lid 30.

The piston 52 and the lid 30 are stably engaged by a pressure of the O-ring 57 installed in the circular groove 56 and operate together in the upward and downward directions. The close-contact portion 33 formed in the upper portion of the slip portion 32 of the lid 30 is closely contacted with the entrance portion 23 of the container body 20.

The lower portion of the cover 53 is closely contacted with the upper portion of the fixing jig 40 for thereby preventing a foreign substance from being inserted into a portion between the fixing jig 40 and the cover 53.

Therefore, when downwardly moving the piston 52 by operating the lever of the dispensing apparatus, the lid 30 being opposite to the piston 52 uniformly downwardly slides in the interior of the container body 20. At this time, the cover 31 installed in the inner side of the slip portion 32 of the lid 30 pressurizes the ice cream, and the slip portion 32 and the close-contacting portion 33 are closely contacted with the inner wall surface of the container body 20 for thereby preventing an ice cream from being leaked in the direction of the upper portion of the lid 30 and implementing an efficient compression of the ice cream.

As described above, the ice cream dispenser according to the present invention is capable of applying an uniform pressure to the lid which slides in the interior of the container body for thereby preventing a damage and transformation of the dispensing container when compressing the dispensing container by the dispensing apparatus.

Therefore, in the present invention, it is possible to decrease the amount of wastes based on a recycling of the dispensing container and prevent an economical loss and save a resource. In addition, it is possible to implement a good sanitation state of an ice cream which may be polluted by a leakage of the ice cream from the damaged dispensing container.

In addition, in the present invention, it is possible to prevent a foreign substance from being inserted into the dispensing container installed in the interior of the dispensing apparatus due to the close contact between the fixing jig and the cover and prevent a leakage of ice cream for thereby implementing a good sanitation state. In addition, it is possible to implement a good returning operation of the piston using the spring installed between the cover and the fixing ring for thereby implementing a convenient use of the ice cream dispenser.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an ice cream dispenser including a container body which is fixed by a fixing jig and has one opened end for receiving an ice cream therethrough and an openable discharging port formed in the other end, a lid for covering the opened end of the container body, and a piston for pressurizing the lid, the lid defined by:

(a) a cover for covering the interior of the container body for discharging an ice cream through the discharging port as the lid slides in the interior of the container body; and (b) a slip portion formed in an outer circumferential surface of the cover for thereby contacting with an inner wall surface of the container body opposite each other, a circular groove being formed along an outer circumferential surface of the piston; and an O-ring being installed into the circular groove, said O-ring outwardly protruding for thereby closely contacting with the inner portion of the slip portion.

2. The dispenser of claim 1, wherein said piston is inserted into the slip portion and is closely contacted with the cover and is connected with a spring, so that the lid is compressed and is returned to its original position.

3. The dispenser of claim 1, wherein an outwardly expanded close-contact portion is formed in an end portion of the slip portion and is contracted in the center direction when advancing into the interior of the container body for thereby elastically contacting with an inner wall surface of the container body.

4. The dispenser of claim 3, wherein an engaging shoulder portion is protruded in the center direction and is formed in an opened one end of the container body for thereby preventing the close-contact portion inserted into the interior of the container body from being escaped to the outside.

5. In an ice cream dispenser including a container body having one opened end for receiving an ice cream therethrough, an openable discharging port formed in the other end, and an engaging shoulder portion which is protruded in the center direction and is formed in the opened one end of the container body for thereby preventing a lid inserted into the interior of the container body from being escaped to the outside, whereby the container body is fixed by a fixing jig; the lid having a cover for covering the interior of the container body for discharging an ice cream through the discharging port as the lid slides in the interior of the container body, a slip portion formed in an outer circumferential surface of the cover for thereby closely contacting with an inner wall surface of the container body opposite each other, and an outwardly expanded close-contact portion which is formed in an end portion of the slip portion and is contracted in the center direction when advancing into the interior of the container body for thereby elastically contacting with an inner wall surface of the container body; and a piston which is inserted into the slip portion of the lid and is closely contacted with the cover and is connected with a spring, so that the lid is compressed an is returned to its original position, the improvement comprising:

(a) circular groove formed along an outer circumferential surface of the piston; and (b) an O-ring installed into the circular groove, said O-ring outwardly protruding for thereby closely contacting with the inner portion of the slip portion.

6. An ice cream dispenser comprising:

a container body having one open end for receiving ice cream therethrough, the container body having an openable discharging port formed in another end;

a fixing jig holding the container body;

a lid having a cover for covering an interior of the container body, the lid being slidably inserted into the container body for discharging ice cream through the discharging port, the lid having a slip portion formed along an outer circumferential surface of the cover for engaging an inner wall surface of the container body, the slip portion being formed on one end with an outwardly extending close-contact portion for elastically contacting an inner wall surface of the container body, the slip portion being inwardly contracted during an advancing of the lid into the interior of the container body; and a piston inserted into the slip portion of the lid, the piston engaging the cover and being connected with a spring, so that the lid may be alternately compressed and returned to an original position, the container body having an engaging shoulder portion which protrudes inwardly and is formed in the one open end of the container body for thereby preventing the lid from escaping to the outside upon insertion of the lid into the interior of the container body, a circular groove being formed along an outer circumferential surface of the piston, an O-ring being installed in the circular groove, the O-ring protruding outwardly for thereby closely contacting the inner portion of the slip portion.

* * * * *